Patented Sept. 12, 1939

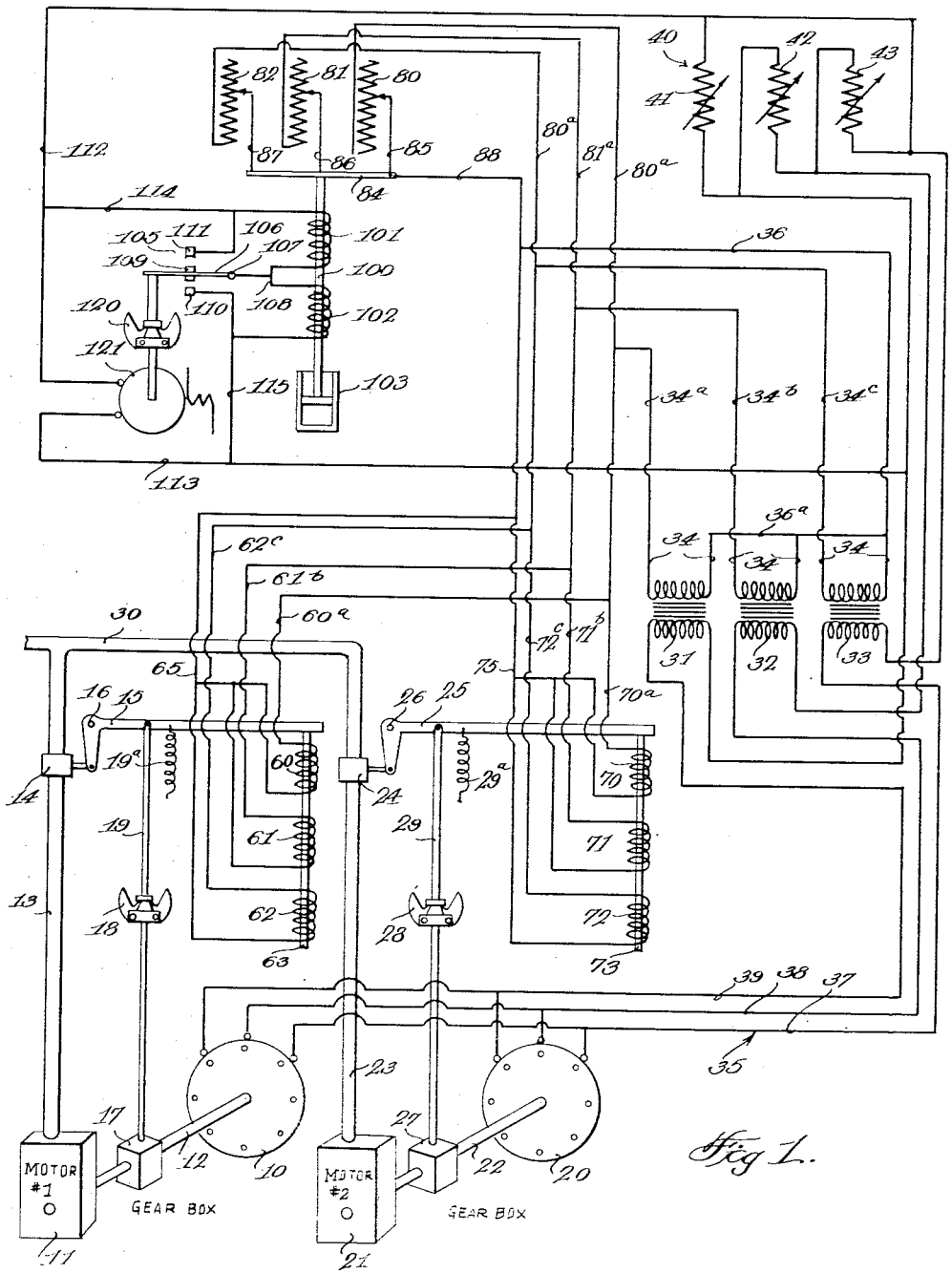

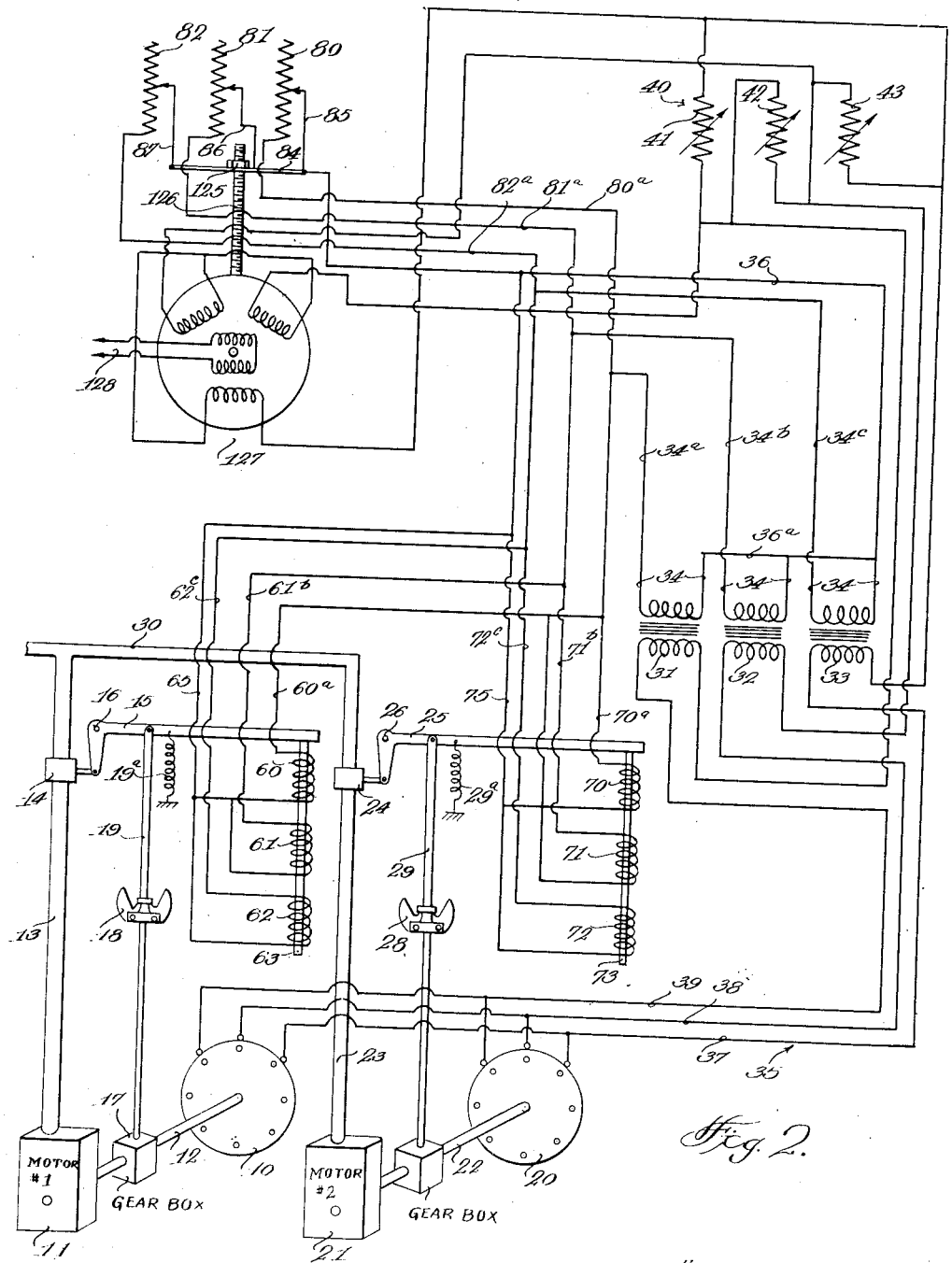

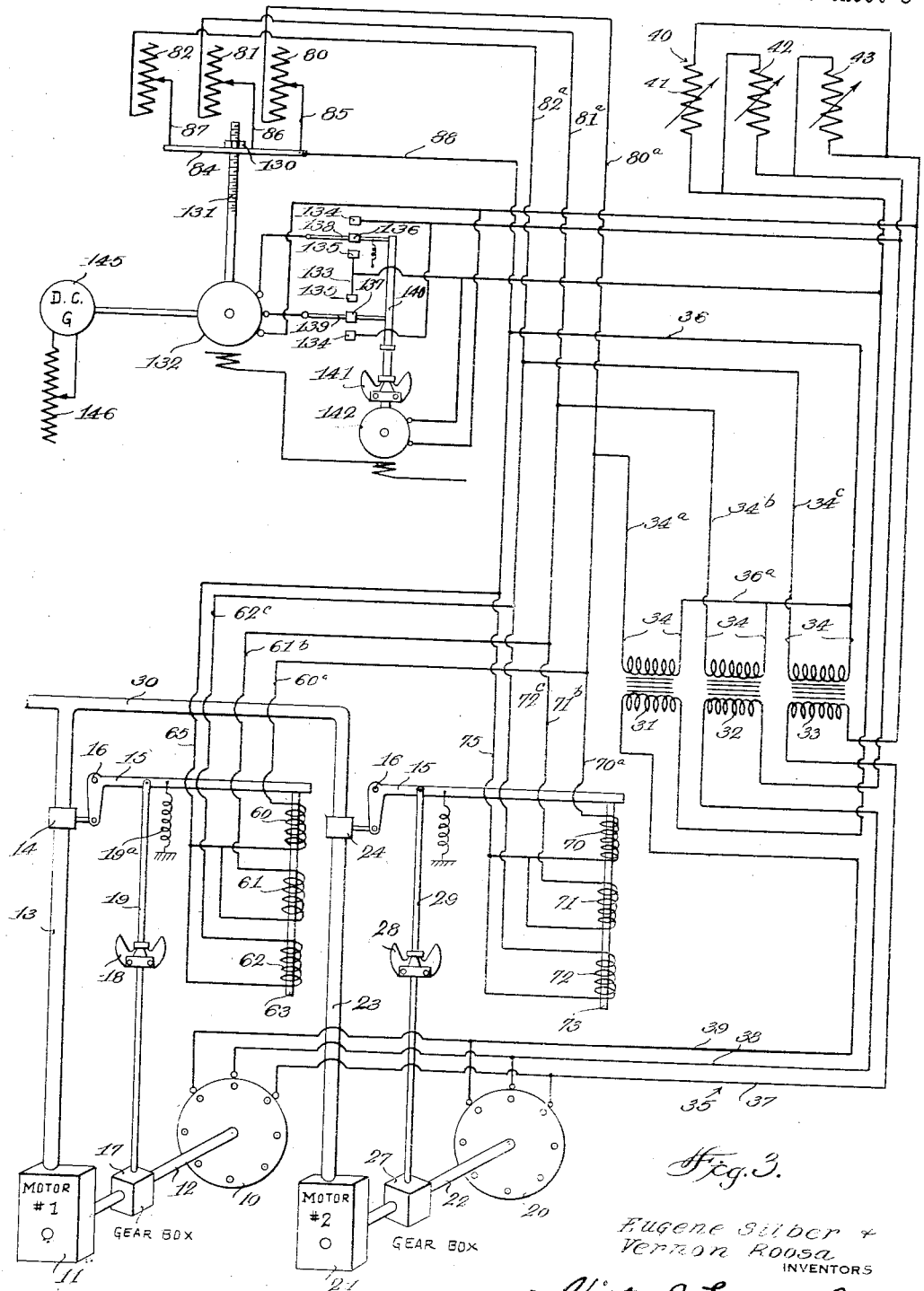

2,173,026

UNITED STATES PATENT OFFICE 2,173,026

SPEED REGULATING MEANS FOR POLYPHASE GENERATOR UNITS

Eugene Silber, New York, and Vernon Roosa, Dobbs Ferry, N. Y.

Application July 19, 1938, Serial No. 220,076

4 Claims. (Cl. 290—4)

This invention relates to improvements in devices for controlling and regulating the speed of prime movers and more particularly to devices for substantially automatically controlling the speed of polyphase electrical generator units associated with a prime mover or prime movers.

It is a major object of the present invention to provide apparatus and means for controlling the speed of a unit comprising a polyphase generator and a prime mover whereby the speed of the generator is regulated in accordance with electrical loads upon the polyphase transmission lines associated with said generator.

It is also an object of the present invention to provide a novel system for varying and controlling speed of a unit comprising a prime mover and polyphase generator, or of several of said units, wherein the speed of the unit or units can be maintained substantially constant or varied in accordance with and in direct proportion with variations in the sum of loads imposed upon different phases of polyphase electrical transmission net works associated with said unit or units.

It is also a major object of the present invention to provide a speed control system of the type hereinbefore referred to which is actuated instantaneously by variations in the electrical load upon the transmission network associated with the generator instead as hertofore necessitating a momentary decrease in the speed of the generator whereby means are actuated causing an increase in speed of the prime mover. That is to say, in speed control devices of the type referred to according to the prior art, imposition of a load upon the electrical transmission network associated with the generator was reflected in a decrease of speed of the generator-prime mover unit due in a major part to the increased torque necessary to drive a loaded generator as compared with the torque required to drive an unloaded generator. It will be noted that in the systems according to the prior art an appreciable time interval elapsed after the imposition of a load upon the system before the speed of the generator was restored to normal.

As hereinbefore referred to it is a major object of the present invention to at least largely minimize the time interval elapsing between the imposition or variation of or in load upon the transmission network associated with the generator before the speed of the generator is returned to normal.

Another object of the present invention is to provide means for electrically comparing frequency of current in a polyphase network with the frequency of current supplied from another source and alternating the frequency of the former to conform with the frequency of the latter, irrespective of whether the frequency of the former be greater or lesser than the frequency of the latter or standard source of current.

It is another object of the present invention to provide speed control means responsive to variations in frequency resultant from variations in load upon any or all phases of a polyphase electrical transmission network, said speed control means being actuable solely by load variations of predetermined and appreciable magnitude.

Another object of the present invention is to provide means for independently varying the speed of a plurality of prime mover generator units supplying current to a polyphase electrical network whereby the speed of the prime movers is altered in a degree proportional to and substantially simultaneously with variations in load on a current transmission network.

One of the more important advantages of the novel speed regulating means according to the present invention is that it facilitates delicate and sensitive control of speed and accordingly of frequency of generator prime mover units whereby it is possible to adjust the frequency of current supply to a transmission network to conform with the frequency of a standard or normal current supply.

Another advantage of the novel speed control means according to the instant invention is that it comprises relatively few moving parts, none of which is especially delicate or likely to wear out rapidly during ordinary use accordingly, the cost of up-keep from the standpoint of depreciation or repair is reduced to a minimum value.

Another advantage of the speed control means according to the present invention is that certain of the elements of the device are conventional electrical devices readily available on the market and other parts of the device are suited to economical fabrication on automatic machinery whereby the initial cost of the speed controlling device as a unit is lower than would be the cost of the device if it were not composed in a measure of standard parts.

Among the features of the novel speed control means according to the present invention are its ruggedness and simplicity of construction, adaptability to controlling speed of a plurality of units, each comprising generator and prime mover and its ability to regulate and control the frequency of current supplied to a polyphase network within narrow limits and over an appreciable period of time without attention or manual adjustment.

Other objects, advantages and features of the novel speed control means according to the present invention will be apparent to those skilled in the art during the course of the following description.

Regarded in certain of its broader aspects, the present invention comprises means for controlling the speed of each of a plurality of electrical current supplying units, each of said units comprising a polyphase alternating current generator and a prime mover driving said generator, speed control means for each of said prime movers, a generator for each of said units feeding a polyphase electrical power transmission network, loads, different in degree and subject to variations substantially unprognosticatable on at least some of the phases in said network, and electrically controlled means adapted to independently actuate each of the speed control means and the several prime movers, said electrically controlled means being connected to said polyphase electrical power transmission network and being actuated substantially instantaneously by and in a degree proportional to any and all variations in the electrical loads on the lines comprising said network.

In order to facilitate a fuller and more complete understanding of the present invention, a specific embodiment thereof will be hereinafter described, it being clearly understood, however, that the illustrated embodiment is given solely by way of example and is non-limitative upon the scope of the present invention, except as expressed in the subjoined claims.

Referring then to the drawings:—

Figure 1 is substantially a diagrammatic illustration of a polyphase electrical current transmission network fitted by a pair of prime mover generator units and provided with speed control means according to the present invention.

Figure 2 illustrates a modified or alternative embodiment of the present invention shown in use in a polyphase current transmission system, and Figure 3 is another alternative embodiment of the present invention likewise illustrated in connection with a polyphase current transmission network.

In order to facilitate a more ready comprehension of the matter of the present invention, the polyphase electrical current transmission network and feeding generators disclosed in connection with the illustrated embodiment of the present invention first will be described.

Referring then to each of the figures, it will be noted that a pair of triple phase electrical generators 10 and 20 and associated with prime movers 11 and 21, respectively, by means including drive shafts 12 and 22. The prime movers 11 and 21 can be any sources of power subject to control such, for example, as internal combustion engines, hydro-turbines, steam turbines, electrical motors or other substantial equivalents thereof. In the illustrated embodiments of the invention it is intended that the prime movers be internal combustion engines, the fuel supply of which passes through ducts 13 and 23 wherein are positioned throttles 14 and 24, said ducts communicating with each other by a line 30 at a point past the throttles and being connected to a fuel supply (not shown).

The throttles 14 and 24 are controlled by means including L-shaped lever arms one of which is associated with each throttle, said lever arms being generally designated by the numerals 15 and 25 and being pivoted at the points 16 and 26 respectively. Gear boxes 17 and 27 associated with the driving shafts 12 and 22 serve to operate governors 18 and 28, the latter being preferably of the centrifugal type whereby as the speeds of the shafts 12 and 22 vary, the vertical movement of sliding bar-like members 19 and 29 is altered in a manner proportional to the variations in speed. Said bar-like members 19 and 29 are associated at upper extremities thereof with the lever arms 15 and 25 substantially as shown, whereby as the speed of the shafts 12 and 22 is increased the bar-like members 19 and 29 are moved upwardly thereby imparting counter clockwise rotative movement to the lever arms 15 and 25 and, by at least partially closing the throttles 14 and 24, altering the supply of fuel passing through the ducts 13 and 23 and thereby decreasing the speeds of the prime movers 11 and 21. It will be noted that springs 19a and 29a are connected to the lever arms 15 and 25 respectively and to portions of the supporting frame work whereby the lever arms normally tend to move in clockwise direction thereby exerting pressure upon the bar-like members 19 and 29.

A conventional triple phase electrical power transmission network generally designated by the numeral 35 comprises the lines 37, 38 and 39. It will be noted that in the illustrated embodiment of the present invention the network therein shown is fed jointly by the generating units 10 and 20. Loads generally designed at 40 are imposed upon the different portions of the transmission network, the load 41 being imposed upon the portion of the network comprising the lines 38 and 39, and the load 43 being imposed upon the lines 37 and 38. Each of these loads is variable independently of the other loads and in a manner which is not readily prognosticatable. It will be noted that transformers generally designated by the numerals 31, 32 and 33 are associated with the current transmission network, one of the windings of each of these transformers being inserted in and forming a part of one of the lines, the transformer 31 for example being associated with the line 39, the transformer 32 being associated with the line 38, and the transformer 33 being associated with the line 37. Hence, it will be apparent that the current in the output lines generally designated at 34 of the transformers 31, 32 and 33 will be proportional to the current flowing in the various phases of the electrical transmission network, each transformer being adapted to vary in output accordingly as the current in different phases of the network is varied. It will be noted that one line of the output of each of the transformers is connected by the line 36a connected to the feed line 36.

In loaded electrical power transmission networks of the type referred to, substantially instantaneous increase in load upon one phase is reflected by a substantially instantaneous increase in the current flowing in the circuit and a substantially instantaneous decrease in electromotive force between the lines of that phase. In other words, if current and voltage measuring devices were incorporated in a loaded electrical transmission network, it would be observed that an increase in load would cause an increase in the current drawn and a decrease in the voltage of the line. Accordingly, in the embodiment of the present invention herein illustrated, an increase in the load 41 would cause an increase in the current flowing in the line 39 and a decrease in the potential difference between the lines 39 and 37. The same would be true of increases in the other loads, in which case, if load 42 were increased, the current flowing in line 38 would be increased and the potential difference between the line 38 and the line 39 would be decreased and, likewise, increase in the load 43 would be reflected in increase of the current flowing in the line 37 and decrease in the potential difference existing between the lines 37 and 38. Inasmuch as windings of the transformers 31, 32 and 33 form a part of the lines 39, 38 and 37, it will be apparent that the current sent into the output lines 34 of each of the transformers will vary in accordance with the variations in the loads and with the potential difference between the output line and said transformers will be proportionally decreased as the load is increased in the respective lines and vice versa.

In the illustrated embodiment of the present invention, two feeding units comprising generator and prime mover are employed although of course it will be understood that as many units as desired may be employed in which case the equipment hereinafter described will be provided on each of said units. The feeding unit controlled by the throttle 14 and comprising a prime mover 11 and generator 10 is provided with a set of solenoids 60, 61 and 62 arranged one above the other in coaxial relationship and having a common core 63 pivotally attached to a portion of the throttle control lever 15. A similar set of solenoids 70, 71 and 72 is provided for the feeding unit controlled by the throttle 24 and comprising the prime mover 21 and generator 20. A common core 73 is positioned inside the solenoids 70, 71 and 72 similarly to the core member 63 hereinbefore referred to. It is preferable that the cores 63 and 73 be bar-like in shape and formed of copper or the like, provided in portions of their length with aggregates of iron, cobalt, nickel and the like whereby passing of current through the solenoids results in movement or at least the tendencies of movement in said core members 63 and 73. It is to be understood that movement of the cores 63 and 73 is reflected in rotative movement of the throttle controlling lever arms 15 and 25 respectively, whereby the throttles 14 and 24 are actuated and the speed of rotation of the prime movers 11 and 21 associated therewith, altered. Controlling current is supplied to the sets of solenoids as follows: a common line 65 is connected to one terminal of each of the solenoids 60, 61 and 62, similarly a common line 75 is connected to one terminal of each of the solenoids 70, 71 and 72 and these common lines 60 and 65 are connected to the line 36 which in turn is connected to one output line each of the transformers 31, 32 and 33 by the line 36a. Referring now to the solenoids 60 and 70 it will be noted that the free terminal of each is connected through the lines 60a and 70a respectively to the output lead 34a of the transformer 31. The free terminal of each of the solenoids 61 and 71 is connected by means of the lines 61b and 71b respectively to the output lead 34b of the transformer 32 and in a similar manner the free terminal of each of the solenoids 62 and 72 is connected by the lines 62c and 72c respectively to the output line 34c of the transformer 33. It will be seen then that the current passing through the solenoids 60 and 70 is the output current of the transformer 31: the current passing through the solenoids 61 and 71 is the output current of the transformer 32 and with the current passing through the solenoids 62 and 72 is the output current of the transformer 33. Inasmuch as the output currents of these transformers, as hereinbefore mentioned are determined by the loading of the different phases of the current transmission network it will be obvious that each set of solenoids will exert magnetic force upon its core member proportional to, and substantially instantaneously variable in accordance with variations in load upon the phases of the network. Assuming for instance that the load 41 is increased, a greater current will flow in the line 39 thereby causing a greater current to flow through the transformer 31 and causing a greater pull to be exerted by the solenoids 60 and 70 upon the core members 63 and 73 respectively thereof, thereby opening the throttles 14 and 24. This, it will be noted, is substantially an instantaneous reaction of the members composing the system to a change in load in the system and does not depend upon a decrease in the speeds at which the armatures of the generators are rotated due to an increase in load whereby the governors 18 and 28 are actuated with corresponding movement of the lever arms 15 and 25. It will be apparent of course that the torque action of the solenoids about the pivot points 16 and 26 of the lever arms 15 and 25 respectively should be sufficient to overcome the counter-torque of the members 19 and 29 acting against the governors 18 and 28.

It is often desirable to control current supplied to the sets of solenoids associated with the prime movers and generators as hereinbefore described. The manner in which this current control is effectuated will now be described.

A resistance bank comprising variable resistors 80, 81 and 82 having sliding contact members 85, 86 and 87 all of said sliding contacts being actuated by movement of the transformers 31, 32 and 33 whereby output current from said transformers feeding said solenoids as hereinbefore described is shunted across said resistors and, upon occasion, at least partially dissipated. It will be noted that one terminal of the resistor 80 is connected by means of the line 80a to the output lead 34a of the transformer 31 and similarly one terminal of each of the resistors 81 and 82 is connected by means of the lines 81a and 82a respectively to the output leads 34b and 34c respectively of the transformers 32 and 33. The sliding contacts of the resistors 80, 81 and 82, interconnected by the plate 84 are connected by means of the line 88 to the common line 36 of the transformer outputs. It will be seen then that the resistor 80 is applied as a shunt across the current supplying lines connected with the solenoids 60 and 70 and similarly the resistors 81 and 82 are shunted across the current supply lines of the solenoids 61—71 and 62—72 respectively. Inasmuch as the resistors serve as shunts across the solenoid feed lines it will be evident that the current passing through the corresponding solenoids, and hence the pull exerted by the solenoids will be substantially directly proportional to the resistance, that is to say, the pull will be greatest for maximum resistance.

The manner in which variation of effective values of the resistances 80, 81 and 82 is produced will now be described. Referring especially to Figure 1, it will be noted that the plate 84 carrying the sliding contacts 85, 86 and 87 whereby the effective values of the resistances 80, 81 and 82 are varied is connected to a vertically slidable core member 100, similar to the cores 63 and 73 hereinbefore described, said core 100 being positioned with superposed solenoids 101 and 102. A dash pot 103 is provided upon the free end portion of the core member 100 and serves to dampen movement of same. It will be noted that the solenoids 101 and 102 are arranged whereby current passing through one solenoid tends to move the core member 100 upwardly and current passing through the other solenoid tends to move the core member downwardly.

Switching means generally designated by the numeral 105 are provided to selectively connect said solenoids to a source of current and comprise a switch arm 106 pivoted at the point 107 and connected to one terminal of each of the solenoids 101 and 102 by means of the line 108. The switching arm 106 is provided with contacts 109 adapted to cooperate with fixedly positioned contact points 110 and 111, said fixed contact points being connected to the free terminal of the solenoids 102 and 101 respectively and to the power lines 112 and 113 by means of the lines 114 and 115 respectively, movement of the switching arm 106 is controlled by centrifugal governor 120 actuated by a synchronous motor 121 connected to the power lines 112 and 113.

It will be seen then that when the frequency of current flowing in the network generally designated by the numeral 35 exceeds a predetermined and preselected value, the synchronous motor 121 will cause the governor 120 to move the switching arm 105 thereby connecting the contacts 109 and 110 and causing current to flow through the solenoid 102 with resultant downward movement of the core member 100 and decrease in the effective resistance values of the resistors 80, 81 and 82 whereby less current is passed through the solenoids 60—61—62, 70—71 and 72, thereby causing upward movement of the solenoid cores 63 and 73 and partial closing of the throttles 14 and 24 whereby the speeds of rotation of the prime movers 11 and 21 are diminished. Conversely when the frequency of the current flowing in the network generally designated by the numeral 35 decreases below a predetermined and preselected value, the synchronous motor 121 acting through the centrifugal governor 120 moves the switch arm 105 causing the contact 109 to connect with the contact point 111 thereby permitting current to flow through the solenoid 101 with resultant raising of the plate 84 and increasing the effective resistance values of the resistors 80, 81 and 82, whereby current supplied to the solenoids 60—61—62, 70—71 and 72 is increased with the result that the throttles 14 and 24 are partially opened and the speed of rotation of the prime movers 11 and 21 is increased. The dash pot 103 is provided to dampen motion of the core member 100 thereby minimizing sudden change in the effective values of the resistors 80, 81 and 82.

It will be seen then that substantially instantaneous variations in load in the different phases of the current transmission network resulting in alternation of the current flowing in the solenoids 60—61—62, 70—71 and 72, results in substantially instantaneous alternation in the fuel supplied to the prime movers whereby compensation is made and the frequency is adjusted to the preselected value. It will also be evident that by means of alternation of the resistors 80, 81 and 82 in the manner hereinbefore described non-instantaneous variations in frequency could be corrected and the system adjusted to compensate for the changes.

It is often desirable to provide means for comparing the frequency of current supplied to a power transmission network with a standard frequency. The embodiment of the present invention illustrated in Figure 2, which will be hereinafter described, is adapted to this purpose and also serves in addition to making the comparison of frequencies to alter the frequency of current in the network to correspond with the standard frequency.

In this embodiment of the invention, the prime movers, solenoids, transformers and resistances described and referred to in connection with the hereinbefore described embodiment of the invention are utilized and are connected substantially as hereinabove explained: the synchronous motor 12, core 100 and apparatus appurtenant thereto are not utilized in this embodiment of the invention.

Referring to Figure 2, it will be noted that the plate 84 is provided with an internally threaded nut 125 fixedly attached thereto and engaging with the threaded rod 126. The threaded rod 126 is associated with and rotatable by a differential motor generally designated by the numeral 127, said motor having its field or stator portions connected across the phases of the triple phase network and having its armature or rotor portion connected by means of the lines 128 to a standard current source of known or controlled frequency. When so connected, the rotor of the motor 127 rotates only when there is a difference in frequency between the current supplied to the field and the current supplied to the armature. Accordingly, changes in position of the sliding resistor contacts 85, 86 and 87 connected to the plate 84 are made solely when a frequency difference exists between the supplied current and the standard. It will be understood of course that variation in the useful values of the resistors 80, 81 and 82 by rotation of the threaded member 126 as aforesaid results in alternation of the current supplied to the solenoids 60—61—62, 70—71 and 72, whereby the rotative speed of the prime movers 11 and 21 is altered substantially as explained in connection with the hereinabove described embodiment of the present invention.

A third method of varying the useful values of the resistances 80, 81 and 82 forms the subject matter of the alternative embodiment or modified form of the present invention illustrated in Figure 3. In this embodiment of the invention an internally threaded nut 130 mounted on the plate 84 engages with a threaded rotatable rod 131 similarly to the nut 125 and threaded rod 126 referred to in the description of the embodiment of the invention illustrated in Figure 2. The threaded rod 131 is arranged with and rotatable by the triple phase motor generally designated by the numeral 132, said motor being dampened as will be hereinafter described and being connected to the triple phase network through switching means generally indicated by the numeral 133. The switching means 133 comprises a reverse switch having stationary terminals 134 and 135 engageable upon occasion, with terminals 136 and 137 carried on pivot switch arms 138 and 139 respectively.

It will be noted that the terminals 134 are connected to the line 38 and that the terminals 135 are connected to the line 39 of the triple phase network. A connecting member 140 pivotally attached to end portions of the switching arms 138 and 139, and arranged with and vertically movable by the synchronous motor 142. The synchronous motor 142 actuates the switching means 133 in substantially the same manner as the synchronous motor 121 actuates the switching means 105 explained in connection with the embodiment of the present invention illustrated in Figure 1, except that in this instance, the triple phase motor 132 is connected to the power lines of the triple phase network only when the frequency of the current flowing in the network varies a predetermined degree from a preselected standard frequency. The direction of rotation of the motor 132 is determined by actuation of the switching means generally designated by the numeral 133, that is to say, when the movable contacts 136 and 137 are connected with the stationary contacts 134 and 135 respectively by raising of the connector member 140, the plate 84 and sliding resistor contacts will move in one direction along the resistors but when the movable contacts 136 and 137 are connected to the terminals 135 and 134 respectively by downward movement of the connector member 140, the sliding resistor contacts will move in the opposite direction. The triple phase motor 132 is dampened by having associated therewith a direct current generator 145, it being understood of course, that the armature of said generator is rotated by rotation of the threaded rod 131. A resistor 146 is imposed across the output of the direct current generator and serves as a magnetic brake. Although this system of dampening is preferred, it will of course be understood that other dampening systems can be employed if deemed more suitable.

Hence, it will be seen that the rotated speed of the generators 10 and 20 actuated by the prime movers 11 and 21 is controlled by the aforesaid means within easily selected limits whereby the frequency of current supplied to the triple phase network could be maintained at a constant value or at least a substantially constant value and, when utilizing the embodiment of the invention illustrated in Figure 2, could be compared with and made to conform with a standard frequency.

It will be apparent of course to those skilled in the art that this control system could be applied to other types of current supply systems for those hereinbefore described by suitable modification without departure from the scope or spirit of the present invention. When used with a polyphase network having more or less phases than three, solenoids and associated equipment hereinbefore described are provided for each phase for each prime mover. That is to say, in a five phase system where three generators are used to supply current to the network, each independently actuated by a prime mover, fifteen solenoids would be used in connection with the triple control of the prime movers directly and similar for other types of polyphase systems. It will of course be understood, however, that only one resistor bank and resistor varying apparatus is required for the polyphase system although one resistor is directed for each phase thereof.

It will also be evident to those skilled in the art that instead of resistors other means of loading the circuits and varying the load could be employed, for example, variable transformers or inductances could be employed should conditions indicate the use of same to be preferable. It will also be evident that when only one prime mover and generator unit is used to feed the network, the throttle control arm of said prime mover could be directly connected to the means for varying the useful values of the resistors whereby the resistors, transformers and solenoids directly connected to the throttle control lever could be eliminated. For instance, in the embodiment of the invention illustrated in Figure 1, the core member 100 could be directly connected to the throttle control lever thereby eliminating the solenoids 60—61—62, 70—71 and 72, transformers 31—32 and 33, and the resistors 80—81 and 82, together with appurtenant apparatus. Similarly in the embodiment of the invention illustrated in Figures 2 and 3, the threaded rods 126 and 131 could be arranged to vary the position of the plate 84 whereby the solenoids, transformers and resistors above referred to could be eliminated. It will of course be understood, however, that this arrangement of apparatus, that is to say, elimination of the solenoids, transformers and resistors is not suited to the control of several units comprising generator and prime mover inasmuch as it would not prevent one of the units from monopolizing or hogging the load as it does when the solenoids, transformers and resistors are used and connected as hereinbefore described.

It will of course be understood by those skilled in the art that alterations of the hereinabove described devices involving the substitution of substantial equivalents for the elements described are intended to be comprehended within the spirit of the present invention and that the invention is capable of extended application and is not confined to the exact showing of the drawings nor to the precise construction described and therefore, such changes and modifications may be made therein as do not affect the spirit of the invention nor exceed the scope thereof as expressed in the subjoined claims.

What is claimed as new is:

1. Speed control for a plurality of electrical current supplying units, each comprising a polyphase alternating current generator, a prime mover driving said generator and speed control means for each of said prime movers; a polyphase electrical power transmission network fed by the generator of each of said units; loads, different in degree and subject to variations substantially unprognosticatable, on at least some of the phases in said network; electrical controlling means for independently operating each and all of the said speed control means, said electrical controlling means being connected into said network whereby current flowing in said network flows through said means, actuating same substantially simultaneously with and in a degree proportional to any and all variations in electrical loads on lines comprising said networks; means for altering flow of current through said electrical controlling means, said means comprising variable resistors, shunted across said electrical controlling means and adapted to by-pass and dissipate current flowing therethrough; and means for varying the effective resistances of said resistors when the frequency of current flowing in said network is altered.

2. Speed control for a plurality of electrical current supplying units, each comprising a polyphase alternating current generator, a prime mover driving said generator and speed control means for each of said prime movers; a polyphase electrical power transmission network fed by the generator of each of said units; loads, different in degree and subject to variations substantially unprognosticatable, on at least some of the phases in said network; electrical controlling means for independently operating each and all of the said speed control means, said electrical controlling means being connected into said network whereby current flowing in said network flows through said means, actuating same substantially simultaneously with and in a degree proprotional to any and all variations in electrical loads on lines comprising said networks; a triple phase differential motor having its field connected to the phases of said network and its rotor to a source of alternating current of standard frequency, whereby the rotor of said motor rotates in one direction when the network frequency exceeds the standard frequency and in the opposite direction when the standard frequency exceeds the network frequency.

3. Speed control for a plurality of electrical current supplying units, each comprising a polyphase alternating current generator, a prime mover driving said generator and speed control means for each of said prime movers; a polyphase electrical power transmission network fed by the generator of each of said units; loads, different in degree and subject to variations substantially unprognosticatable, on at least some of the phases in said network; electrical controlling means for independently operating each and all of the said speed control means, said electrical controlling means being connected into said network whereby current flowing in said network flows through said means, actuating same substantially simultaneously with and in a degree proprotional to any and all variations in electrical loads on lines comprising said networks; a triple phase motor, switches connecting said motor with the phases of said network for causing operation thereof and reversing direction of rotation of the rotor of said motor and means for operating said switches comprising a speed sensitive device operated by a synchronous motor connected across the phases of said network.

4. Speed control for a plurality of electrical current supplying units, each comprising a polyphase alternating current generator, a prime mover driving said generator and speed control means for each of said prime movers; a polyphase electrical power transmission network fed by the generator of each of said units; loads, different in degree and subject to variations substantially unprognosticatable, on at least some of the phases in said network; electrical controlling means for independently operating each and all of the said speed control means, said electrical controlling means being connected into said network whereby current flowing in said network flows through said means, actuating same substantially simultaneously with and in a degree proportional to any and all variations in electrical loads on lines comprising said networks; a pair of solenoids coaxially mounted, a common core for said solenoids, switches connecting said solenoids with said network for operation thereof, and speed sensitive means, operated by a synchronous motor connected to said network, for actuating said switches and causing movement of said core in one direction when the frequency of current in said network exceeds a predetermined value and in the opposite direction when the network frequency is less than said value.

EUGENE SILBER.
VERNON ROOSA.